Oct. 29, 1957  F. B. HODGDON ET AL  2,811,576
HIGH FREQUENCY ELECTRODE
Filed July 20, 1954

INVENTORS
FRANK B. HODGDON
HARVARD B. VINCENT
BY
ATTORNEYS

United States Patent Office 2,811,576
Patented Oct. 29, 1957

2,811,576

HIGH FREQUENCY ELECTRODE

Frank B. Hodgdon and Harvard B. Vincent, Toledo, Ohio, assignors to Owens-Illinois Glass Company, a corporation of Ohio Application July 20, 1954, Serial No. 444,432

3 Claims. (Cl. 174—167)

This invention relates to the provision of conductive electrical elements in the walls of glass articles, and in particular to a specific structure for such elements whereby certain difficulties heretofore encountered in the use and mounting of such elements may be obviated.

Normally in the mounting or inserting of electrical conducting elements in, and/or through a glass wall, there is only encountered the problem of the difference in expansion and contraction as between the material of the element and the glass. For example, the anode buttons used in the wall of the usual glass picture tube in a normal monochrome picture television set. Such buttons are made of a material which is conductive and which has expansion characteristics compatible with those of the glass member.

However, in the chromatic type tubes, part of the electrical energy which must pass into the tube from an external source is in the form of a high frequency, high wattage current. The electrode which conducts this current must therefore be designed to permit shielding and the dielectric must be chosen so that when assembled in the outer conducting shell, a unit having low inductance, and creating a low external field will be formed. This requires that the insulating part of the assembly be made from a low loss, low conductivity material.

In the feed-through elements, forming the subject matter of this invention, it is desirable to use a highly conductive material for the actual conducting portion of the element, and in most instances such materials have characteristics of expansion and contraction which differ radically from that of the glass. It is, therefore, necessary to provide some means in the structure to compensate therefor.

Consequently, in this invention an assembly of interconnected parts has been devised whereby compensation for this radical difference in expansion and contraction as between the glass and the conducting material will be provided while retaining the highly desirable sealing characteristics as between glass and the element proper as well as between the material of the conductors and the element.

Among the objects of this invention is the provision of means of bringing energy or power to the inside of a hollow article such as a television tube of the chromatic type.

A further object is the provision of a component element for the transmission of electrical energy to power an element such as a grid or color pack in a television tube.

A still further object is the provision of such a component element wherein the wattage loss is maintained at a low level by the specific structure supplied in the element.

Another object is the supplying of an element which provides radiation shielding to produce a low external field, high conductivity, low inductance and low dielectric loss.

Other objects will be apparent from the following disclosure.

Figure 1:
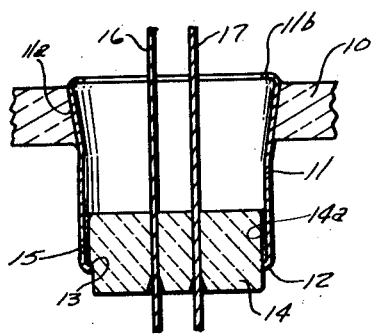
Fig. 1 is a fragmentary elevation through the element showing it in complete assembly with a glass member.
Figure 2:
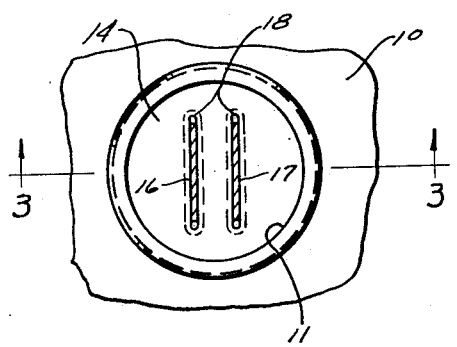
Fig. 2 is a plan view of the assembly.
Figure 3:
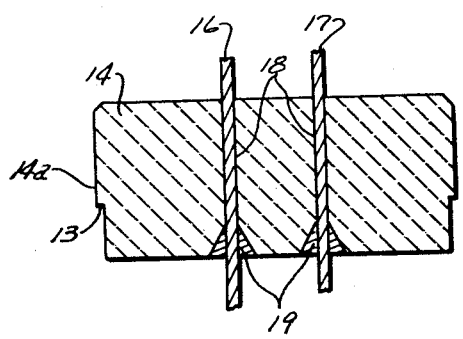
Fig. 3 is a cross-section on the line 3—3 on Fig. 2 showing the dielectric insert and the embedded conductors soldered together.

In the use of these radio frequency feed-through elements, in normal service the operation of a television tube for example, temperatures of 50° C. are reached, while in the processing or finishing of the tube, temperatures of approximately 400° C. will be encountered while in the sealing of the electrode shell into the glass wall, temperatures of approximately 1100° C. will be encountered. Because of these comparatively high temperatures it is necessary in constructing the element to provide a means whereby the expansion and contraction characteristics of the several component parts are made compatible with each other to the extent that separation as between any two component parts and subsequent cracking or leakage will be prohibited.

In this particular assembly, there are four distinct elements to contend with, namely, the glass which has a thermal expansion coefficient of $102 \times 10^{-7}/°$ C., a metal shell which in this instance may be stabilized #430 stainless steel with a thermal expansion coefficient of $120 \times 10^{-7}/°$ C., a dielectric disk which is alumina with a thermal expansion coefficient of $75 \times 10^{-7}/°$ C., and finally, copper conductors in thin strip form having a thermal expansion coefficient of approximately $150 \times 10^{-7}/°$ C.

The metal shell has contact with both the glass and the alumina insert. The #430 stainless or other alloy steel from which the shell may be made has an ideal capacity for hermetically sealing to glass of the type usually used in television tubes. It will be noted that there is a very small differential as between the thermal expansion coefficients of the glass and the metal shell, with the greater coefficient of expansion being that of the metal shell which permits the shell to follow the glass under extreme expansion conditions.

The metal shell is also in contact with and supports the alumina disk which is of sufficient thickness to provide the required mechanical strength. Alumina requires excessively high temperatures to affect it in so far as deformation is concerned, and it will be a rare and unexpected occasion when during the use or processing of these elements that temperatures will ever be reached sufficient to provide any appreciable degree of deformation in this member.

With regard to the metal shell and in particular the areas in which it has contact with the alumina insert or disk, it should be apparent that although the end which is in contact with the glass at the time of sealing must in an extremely short time period reach a temperature compatible with that of the glass at the time of sealing, such a temperature ordinarily will not be reached at the end supporting the disk in such a short period of time. Consequently, a lesser degree of expansion of the shell will occur at the juncture with the alumina disk.

With regard to the strip conductors which are made of copper they, of course, have a degree of expansion greater than that of the disk and the question of breaking the seal as between the conductors and the disk becomes almost negligible. In addition these flat strip shaped conductors provide the high surface area characteristic which is an extremely desirable and needed feature in these conductor elements.

A further element which enters into this situation is the material utilized to provide the connection or seal as between the insert disk, its metal supporting shell and the copper conductors. This in most instances will be a material such as silver solder which in one of its forms has a high melting point of approximately 820° C. and a flow point of 870° C. These temperatures are in the neighborhood of those at which the sealing of the metal disk to the glass will occur, but again the particular structure of the shell is such that these temperatures may not be reached around these silver solder connections. From the preceding it should be apparent that the separate elements that make up this feed-through device have coefficients of expansion which are in a range and so arranged that they are conducive to maintaining a seal under any of the temperature conditions which may be met within the manufacture or use of this device.

In order to accomplish the desirable features in this element as shown in Fig. 1, there is shown mounted in a glass wall 10 a thin outer metal shell 11 made, for example, of a material, such as stabilized #430 stainless steel which has good glass sealing characteristics, such as, a coefficient of expansion compatible with that of the glass and thus permits being hermetically sealed to the glass 10.

The lower end of the metal 11 has a shoulder 12, and inserted in the metal shell to form an end closure therefor is a disk or insert member 14 made from a vitreous ceramic composition such as alumina, which is vitreous, non-conductive and which is capable of being joined to this metal shell by a suitable method. It is also contemplated that these insert members 14 may also be made from any material which may provide the desirable dielectric characteristics including ceramic compositions ordinarily classed as glass and electrical porcelain. The disk or member 14 is provided with a shoulder 13 which seats upon shoulder 12 of the metal shell 11. These two parts are joined at this shoulder and along the sides 14ª by various methods, such as soldering, brazing or cementing, thereby providing a leak-proof hermetically sealed joint 15.

The upper end of the shell 11 is formed with an outwardly flaring coniform shape 11ª to provide a means whereby when the component element is sealed into the glass wall 10, it will tend to always retain its wall-to-glass contact when affected by the action of gravity during the sealing operation. This coniform portion 11ª is also provided with an inwardly extending shoulder 11ᵇ to give both rigidity to the shell 11 and also to provide a means for attaching the source of electrical energy to said shell. For example, when this element is to be sealed into a glass wall an opening is provided in the glass wall having a diameter of approximately the same as that of the cylindrical portion of the element, and as the element is seated in the opening the coniform portions will stop it from passing completely through the opening and maintain the wall-to-glass contact.

This alumina member 14 is an important part of the component element assembly because it provides a major portion of the basis for low wattage loss mainly because of its low permeability, its low conductivity and its low dielectric loss. In these capacities it is far superior to glass or other similar materials.

The leads or conductors 16 and 17 of the required number, extend through openings or slots 18 in the ceramic disk 14 and are soldered, brazed or cemented therein and thereto as at 19, both for location and for leak-proof sealing. These leads 16 and 17 may extend outwardly from each face surface of the member 14 to any desired or needed distance.

This conductor unit may be assembled by several different methods, for example, the leads 16 and 17 may be first sealed into the member 14 and then the member 14 sealed into the shell 11, or the various component parts may be arranged in final assembly relationship and all sealed together simultaneously. Other methods may also be practiced for assembling this unit conductor.

From the preceding description it should be apparent that this assembled component unit provides a means whereby high frequency electrical energy may be passed from an external source to the inside of a hermetically sealed television or other tube and that shielding and low external field is provided, the alumina disk providing low permeability, low conductivity and low dielectric loss.

Modifications may be resorted to within the spirit and scope of our invention.

We claim:

1. An assembled electrical conductor unit, comprising an elongated cylindrical shell of metal, the bottom end of said shell being inwardly turned to form a supporting shoulder, the top end being outwardly flared in coniform shape with an inwardly extending shoulder, said coniform shaped portion being hermetically sealed to a surrounding glass wall, the shouldered bottom end of said shell supporting a shouldered low loss dielectric insert, a portion of said insert extending beyond the bottom end of said shell, electrodes of high surface area extending through said disk and outwardly from each face thereof, said electrodes being hermetically sealed to said insert along the bottom surface thereof and said insert being hermetically sealed to said shell.

2. An assembled electrical conductor unit, comprising an elongated cylindrical shell of alloy steel, the bottom end of said shell being inwardly turned to form a supporting shoulder, the top end being outwardly flared in coniform shape with an inwardly extending shoulder, said coniform shaped portion being hermetically sealed to a surrounding glass wall, the shouldered bottom end of said shell supporting a shouldered alumina insert, a portion of said insert extending beyond the bottom end of said shell, flat strip electrodes extending through said insert and outwardly from both faces thereof, said electrodes being hermetically sealed to said insert along the bottom surface thereof and said insert being hermetically sealed to said shell.

3. An assembled electrical conductor unit, comprising an elongated cylindrical shell of stainless steel, the bottom end of said shell being inwardly turned to form a supporting shoulder, the top end being outwardly flared in coniform shape with an inwardly extending shoulder, said coniform shaped portion being hermetically sealed to a surrounding glass wall, the shouldered bottom end of said shell supporting a shouldered alumina insert, a portion of said insert extending beyond the bottom end of said shell, flat strip copper electrodes extending through said insert and outwardly from each face thereof, said electrodes being hermetically silver soldered to said insert along the bottom surface thereof and said insert being hermetically sealed to said shell.

References Cited in the file of this patent

UNITED STATES PATENTS

| | | |
|---|---|---|
| 2,162,234 | Thomas | June 13, 1939 |
| 2,459,193 | Sparks | Jan. 18, 1949 |
| 2,632,033 | Krefft | Mar. 17, 1953 |